Figure 1:
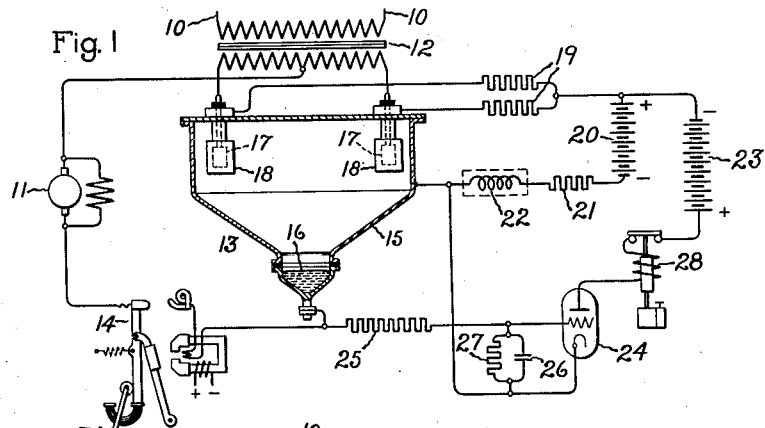

July 27, 1937.  E. H. REID  2,088,436
VAPOR ELECTRIC RECTIFYING SYSTEM
Filed May 19, 1931

Inventor:
Eugene H. Reid,
by Charles E. Mullen
His Attorney.

Patented July 27, 1937

2,088,436

UNITED STATES PATENT OFFICE 2,088,436

VAPOR ELECTRIC RECTIFYING SYSTEM

Eugene H. Reid, Schenectady, N. Y., assignor to General Electric Company, a corporation of New York Application May 19, 1931, Serial No. 538,562

11 Claims. (Cl. 175—363)

My invention relates to vapor electric rectifying systems and more particularly to such systems provided with means for suppressing reverse arcs within the vapor electric apparatus.

It is a well known fact that vapor electric apparatus, in operation, are subject to reverse arcs which may be occasioned by any of a number of disturbing operating conditions. In case the vapor electric apparatus is supplying a load circuit which does not have an independent counter-electromotive force, the reverse arcs within the apparatus are limited to arcs between the several anodes of the apparatus, but if the load circuit develops a counter-electromotive force, such, for example, as that generated by a direct current motor, the reverse arcs within the vapor electric apparatus may form either between the anodes of the apparatus or between the cathode acting as an anode and a negative anode acting as a cathode. Such reverse arcs within vapor electric apparatus, if allowed to persist, may cause serious damage not only to the apparatus itself but to the system and other apparatus with which the vapor electric apparatus is associated. Heretofore, there have been proposed certain arrangements which have had as their object the elimination or suppression of reverse arcs in vapor electric rectifiers. These arrangements of the prior art, however, have left something to be desired in the way of certainty and rapidity of action.

It is an object of my invention, therefore, to provide an improved vapor electric rectifying system in which a reverse arc occurring in the apparatus will be suppressed with a maximum of certainty and rapidity.

It is another object of my invention to provide an improved vapor electric rectifying system in which the anodes of the vapor electric apparatus are surrounded with conductive shields or grids on which a negative potential is impressed upon the occurrence of a reverse arc in the apparatus.

It is a further object of my invention to provide an improved vapor electric rectifying system including a vapor electric apparatus provided with conductive anode shields or grids on which a negative potential will be impressed substantially simultaneously with the occurrence of a reverse arc in the apparatus and without the aid of moving parts or contacts.

It is a still further object of my invention to provide an improved vapor electric rectifying system including a direct current load having an independent counter-electromotive force and a vapor electric apparatus provided with conductive anode shields or grids on which a negative potential will be impressed upon the occurrence of a reverse arc and in which the direct current load circuit will be simultaneously interrupted.

In accordance with one embodiment of my invention, a vapor electric rectifying apparatus is provided with conductive anode shields upon which are impressed normally a positive potential to maintain the apparatus in a conductive state. A substantially higher negative potential is also connected to these grids through a normally non-conductive electric valve. The grid of the electric valve is so connected to the system as to be responsive to transients due to the occurrence of a reverse arc in the apparatus. For example, upon the occurrence of a reverse arc, it has been discovered that the metal container or tank of a vapor electric apparatus provided with an insulated cathode changes its potential with respect to a reference point of said apparatus, such as the cathode, so that it becomes negative with respect to its cathode, while under normal operating conditions it is positive with respect to its cathode. This reversal of polarity may be used to excite the grid of the above-mentioned electric valve. In accordance with a modification of my invention, the grid of the above-mentioned electric valve may be excited from a current transformer responsive to surges in the direct current circuit of the system. In still another modification of my invention, a negative potential is applied to the grids of the vapor electric apparatus by means of a mercury switch mechanically interlocked with a high speed circuit breaker in the direct current circuit of the system.

Figure 2:
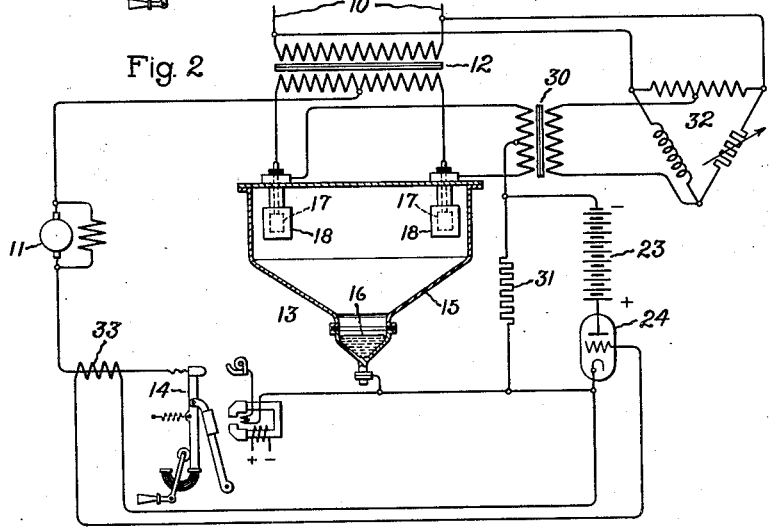
Figure 3:
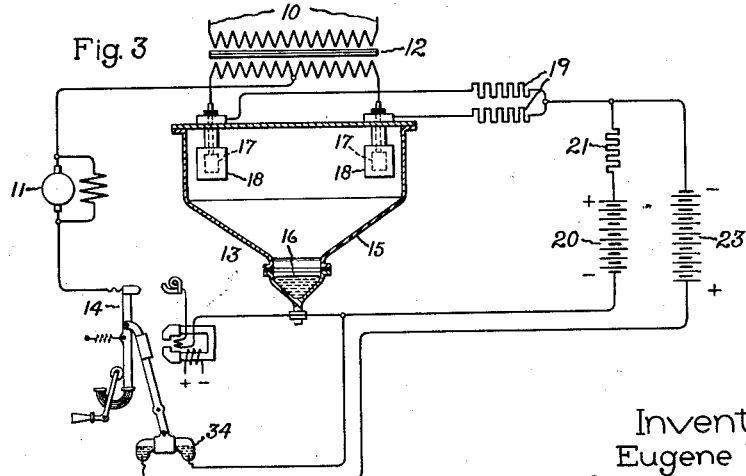

For a better understanding of my invention, together with other and further objects thereof, reference is had to the following description taken in connection with the accompanying drawing and its scope will be pointed out in the appended claims. Fig. 1 of the accompanying drawing illustrates one embodiment of my invention in which a reversal of tank to cathode potential is utilized to suppress a reverse arc in a vapor electric apparatus; Fig. 2 illustrates an application of my invention to a system in which the average voltage of the direct current circuit may be varied by shifting the phase of an alternating potential applied to the grids of the vapor electric apparatus and in which the application of a negative potential to these grids is effected in response to current surges in the direct current circuit, while Fig. 3 shows a simplified form of my invention which may be suitable in certain instances and in which the use of an auxiliary electric valve is eliminated.

Referring now to Fig. 1, I have illustrated a vapor electric rectifying system for transmitting energy from an alternating current supply circuit 10 to a direct current load device illustrated as a motor 11. This system includes a transformer 12, a vapor electric rectifying apparatus 13, and a high speed direct current circuit breaker 14, which may be of any of the several types well known in the art, although I prefer to use circuit breakers of the type disclosed and claimed in United States Letters Patent No. 1,560,440, granted November 2, 1925 on the application of J. F. Tritle. The vapor electric rectifying apparatus 13, examples of which are well known in the art, comprises a metal tank or other conductive container 15, an insulated mercury pool cathode 16, a pair of anodes 17 and a pair of conducting shields or grids 18 surrounding the anodes 17 and insulated therefrom. While I have illustrated a two-anode vapor-electric apparatus, it will be apparent that my invention is equally applicable to such apparatus having a larger number of anodes, as would be used in polyphase rectifying systems. In order to keep the vapor-electric apparatus 13 in a normally conductive state, the grids 18 are connected to the tank 15 through grid resistors 19, a positive bias battery 20, a resistor 21 and a relay or signal device 22. The grids 18 are also connected to the metal tank 15 through grid resistors 19, a negative bias battery 23, which is preferably of a considerably higher voltage than the battery 20, and a normally nonconductive electric valve 24. The valve 24 is provided with an anode, a cathode and a control grid and may be of any of the several types well known in the art, although I prefer to use a valve of the vapor electric discharge type. If the cathode of the apparatus 13 is chosen as the reference point of the apparatus the grid of the valve 24 is connected to the cathode 16 through a high resistance 25 and may be connected to its cathode through a capacitor 26 and a parallel connected grid leak 27. In certain cases it may be desirable to return the apparatus to an operative condition after a predetermined interval during which the disturbing conditions will have had time to disappear. This result may be accomplished by inserting in the valve circuit the contacts and operating coil of a time delay opening relay 28.

The general principles of operation of the full wave rectifying system comprising the transformer 12, the vapor electric apparatus 13, and the direct current load device 11 will be well understood by those skilled in the art, so that a detailed explanation is not deemed necessary. Under normal operating conditions the grids 18 will be positive with respect to the tank 15 by the voltage of the bias battery 20, while the tank 15 is normally slightly positive with respect to the cathode 16. Under these conditions the apparatus 13 is completely conductive and the grids 18 are ineffective. It will be assumed that the circuit breaker 14 is closed and that energy is being supplied to the motor 11. Upon the occurrence of a reverse arc, that is, in case one of the anodes 17 acts as a cathode, a short circuit will be placed upon the transformer 12 during the half cycle that the faulty anode is negative with respect to the other anode and during the same half cycle the counter-electromotive force of the load device 11 will tend to send reverse power through the rectifying apparatus. The flow of reverse power occasioned by the reverse arc causes the circuit breaker 14 to open and thus interrupt the flow of reverse power, but this does not remove the short circuit from the transformer 12. However, it has been discovered that the occurrence of such an arc back causes the potential of the tank 15 to reverse polarity with respect to the cathode 16 substantially instantaneously so that the tank becomes negative with respect to the cathode. If the cathode is not taken as the reference point of the apparatus but some other point such as ground or some conductor of which the absolute potential remains substantially constant under all conditions is utilized, the change in the potential between the tank and a conductive member in contact with the vapor therein is utilized to actuate the valve 24. The necessary changes in the cathode and control electrode or grid connections will be obvious to those skilled in the art. With the connections as described above, this results in placing a positive potential upon the grid of electric valve 24 to render it conducting, thus connecting the grids 18 to the tank 15 through the grid resistors 19, the negative bias battery 23 and electric valve 24. Under this condition the arc back will persist only for the remainder of the particular half cycle and thereafter the negative potential on the grids 18 prevents a discharge from starting from the positive anode 17 to the negative faulty anode 17. When the valve 24 becomes conductive, it will be noted that the alarm device or relay 22 is energized from the batteries 20 and 23 in series through current limiting resistor 21 and electric valve 24. As long as electric valve 24 is conducting current, the vapor electric apparatus 13 is maintained in an inoperative condition. In some instances, however, it may be desirable to restart the operation of the vapor electric apparatus after a time interval sufficient to allow the disturbing conditions to disappear. This is accomplished by means of the time delay opening relay 28, the operating coil and contacts of which are connected in series with electric valve 24. After a predetermined time interval, this relay opens its contacts, thus interrupting the current through the valve 24 and allowing the positive bias battery 20 to regain control of the grids 18 and render the apparatus 13 fully conductive. In order to prevent operation of the apparatus, upon the occurrence of extremely short transients, the condenser 26 may be connected between the grid and cathode of the valve 24 to absorb these short transients. In such case a grid leak 27 is preferably provided to allow the charge to leak off the condenser 26.

In Fig. 2, there is illustrated an application of my invention to a vapor electric rectifying system in which the average voltage of the direct current circuit may be controlled by impressing upon the grids 18 an alternating potential variable in phase with respect to the potential of the anodes 17. In this arrangement the grids 18 are connected to the cathode 16 through opposite halves of the secondary winding of a grid transformer 30 and a current-limiting resistor 31, while the primary winding of the grid transformer 30 may be energized from any suitable source of alternating potential synchronized with that of the circuit 10 and variable in phase with respect thereto. I have shown by way of example an impedance phase shifting circuit such as that described and claimed in United States Letters Patent No. 1,719,366, granted July 9, 1929, upon the application of E. F. W. Alexanderson. In the arrangement of Fig. 2, the operation of the arc suppressing means is also modified to be responsive to current surges in the direct current circuit. This is accomplished by connecting the electrical midpoint of the secondary winding of grid transformer 30 through the negative bias battery 23 and the vapor electric valve 24 to the cathode 16 of the rectifier 13. The grid of the valve 24 is energized from the secondary winding of a current transformer 33 connected in the direct current circuit. The operation of the rectifying system controlled by the variable phase grid potential will be well understood by those skilled in the art or may be found explained in detail in United States Letters Patent No. 1,654,949, granted January 3, 1928, upon the application of P. M. G. Toulon. As in the arrangement shown in Fig. 1, in case of a reverse arc between the anodes 17, the circuit breaker 14 will disconnect the direct current circuit and a current surge will occur in the direct current circuit which will induce a potential in the secondary winding of the transformer 33. This transient potential is impressed upon the grid of the valve 24 to render it conductive, thus connecting the negative bias battery 23 between the cathode 16 and the control grids 18. The reverse arc will then persist only for the remainder of the particular half cycle and will be prevented from restarting, as in the arrangement of Fig. 1.

In Fig. 3 is shown a simplification of the arrangement illustrated in Fig. 1 in which the grids 18 are connected to the cathode of the rectifier apparatus 13, rather than the tank 15, through current-limiting resistors 19, a current-limiting resistor 21, and the positive bias battery 20, respectively. A mercury contact switch 34 is mechanically interlocked with the direct current circuit breaker 14 so as to impress the negative bias potential of the battery 23 upon the grids 18 when the circuit breaker 14 opens in response to reverse current due to a reverse arc in the rectifier apparatus.

While I have described what I at present consider the preferred embodiments of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is,—

1. In combination with a vapor electric converter comprising a cathode, a plurality of anodes and associated control grids, a circuit connecting said grids with a point on said converter normally substantially at cathode potential and including a source of grid potential for normally rendering said converter conductive, and means for suppressing an arc between said anodes comprising a second circuit connecting said grids and said point and including a source of negative bias potential and a normally non-conductive electric valve, and means responsive to a change of potential of said point with respect to said cathode for rendering said valve conductive.

2. In combination with a vapor electric converter comprising a conductive container, an insulated cathode, a plurality of anodes and associated control grids, means for suppressing an arc between said anodes comprising means responsive to a reversal of the potential between said cathode and said container for impressing upon said grids a negative bias potential.

3. In combination with a vapor electric converter comprising a conductive container, an insulated cathode, a plurality of anodes and associated control grids, means for suppressing an arc between said anodes comprising a circuit connecting said grids and said container and including a source of negative bias potential and a normally non-conductive electric valve, and means responsive to a reversal of the potential between said cathode and said container for rendering said valve conductive.

4. In combination with a vapor electric converter comprising a conductive container, an insulated cathode, a plurality of anodes and associated control grids, means for suppressing an arc between said anodes comprising a circuit connecting said grids and said container and including a source of negative bias potential and an electric valve provided with a control grid, and a connection from said valve grid to the cathode of said converter.

5. In combination with a vapor electric converter comprising a conductive container, an insulated cathode, a plurality of anodes and associated control grids, means for suppressing an arc between said anodes comprising a circuit connecting said grids with a point of said converter normally substantially at cathode potential and including a source of negative bias potential and a normally non-conductive electric valve provided with an anode, a cathode, and a control grid, means for impressing upon said valve grid a potential transient occasioned by said arc, and a condenser connected between the cathode and grid of said valve to absorb smaller transient potentials occasioned by minor disturbances.

6. In combination, with a vapor electric converter comprising an insulated cathode, a plurality of anodes and associated control grids, means for suppressing an arc between said anodes comprising a circuit connecting said grids with a point of said converter normally substantially at cathode potential and including a source of negative bias potential and a normally non-conductive electric valve, means responsive to a change in potential of said point with respect to said cathode for rendering said valve conductive, and a time delay relay having an operating coil and a pair of normally closed contacts serially connected in said circuit to restore said converter to normal operating conditions after a predetermined interval.

7. In a vapor electric rectifying system, the combination of an alternating current supply circuit, a direct current load circuit, a vapor electric converter comprising a conductive container, an insulated cathode, and a plurality of anodes and associated control grids, a circuit connecting said grids and said container and including a source of positive bias potential, means for suppressing an arc between said anodes comprising a second circuit connecting said grids and said container and including a source of negative bias potential and a normally non-conductive electric valve provided with an anode, a cathode, and a control grid, a connection from said valve grid to the cathode of said converter, a condenser connected between the grid and cathode of said valve, a time delay relay having an operating coil and a pair of normally closed contacts serially connected in said circuit to restore said converter to normal operating conditions after a predetermined interval, and means for suppressing a reverse arc between the cathode and anodes of said converter comprising means responsive to a reverse arc for disconnecting said load circuit.

8. In a vapor electric rectifying system, the combination of an alternating current supply circuit, a direct current load circuit, a vapor electric converter comprising a cathode, a plurality of anodes and associated control grids, and means for suppressing an arc between said anodes comprising a circuit connecting said grids with a point of said converter substantially at cathode potential and including a source of negative bias potential and a normally non-conductive electric valve, and means responsive to a predetermined rate of change of current in said direct current circuit for rendering said valve conductive.

9. In a vapor electric rectifying system, the combination of an alternating current supply circuit, a direct current load circuit, a vapor electric converter comprising a cathode, a plurality of anodes and associated control grids, and means for suppressing an arc between said anodes comprising a circuit connecting said grids with a point of said converter substantially at cathode potential and including a source of negative bias potential and a normally non-conductive electric valve provided with an anode, a cathode, and a control grid, a series transformer in said direct current circuit, and a circuit for energizing said valve grid from said series transformer.

10. In combination with a vapor electric converting apparatus comprising an anode, a cathode, and a conductive member in contact with the ionized vapor of the apparatus, means responsive to a reversal of the potential between said conductive member and said cathode for controlling the operation of said apparatus.

11. In combination with a vapor electric converting apparatus comprising an anode, a cathode, and a conductive member in contact with the ionized vapor of the apparatus, a device for indicating abnormal conditions of said converter, and means responsive to a reversal of the potential between said conductive member and said cathode for operating said indicating device.

EUGENE H. REID.